United States Patent
Sato

(10) Patent No.: US 7,072,325 B1
(45) Date of Patent: Jul. 4, 2006

(54) CELLULAR SYSTEM

(75) Inventor: Toshifumi Sato, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/260,903

(22) Filed: Mar. 2, 1999

(30) Foreign Application Priority Data

Mar. 4, 1998 (JP) ............................................. 10-051656

(51) Int. Cl.
*H04B 1/02* (2006.01)

(52) U.S. Cl. ........................ 370/342; 370/328; 370/335; 370/441; 455/101

(58) Field of Classification Search .................. 370/328, 370/329, 334, 335, 342, 320, 441, 339
See application file for complete search history.

(56) References Cited

U.S. PATENT DOCUMENTS

| | | | | |
|---|---|---|---|---|
| 5,559,789 A | * | 9/1996 | Nakano et al. | 370/342 |
| 5,732,075 A | | 3/1998 | Tangemann et al. | |
| 5,809,083 A | * | 9/1998 | Wright | 375/285 |
| 6,141,332 A | * | 10/2000 | Lavean | 370/208 |
| 6,141,542 A | * | 10/2000 | Kotzin et al. | 455/101 |

FOREIGN PATENT DOCUMENTS

| | | |
|---|---|---|
| CA | 2202829 | 11/1997 |
| CA | 2298647 | 2/1999 |
| EP | 0795969 A | 9/1997 |
| EP | 0798872 A | 10/1997 |
| GB | 2-295524 A | 5/1996 |
| JP | 6-13956 | 1/1994 |
| JP | 8-88589 | 4/1996 |
| JP | 8-265837 | 10/1996 |
| JP | 09-261761 | 3/1997 |
| JP | 9-238098 | 9/1997 |
| JP | 9-247744 | 9/1997 |
| JP | 9-252266 | 9/1997 |
| WO | WO-96/37969 A | 11/1996 |
| WO | WO-96/37970 A | 11/1996 |
| WO | WO 96/37970 | * 11/1996 |
| WO | WO 98/59512 | * 12/1998 |
| WO | WO-98/59512 A | 12/1998 |

OTHER PUBLICATIONS

European Search Report.
Japanese Office Action issued Apr. 11, 2000 in a related application with English translation of relevant portions.

* cited by examiner

*Primary Examiner*—Nick Corsaro
*Assistant Examiner*—Alan T. Gantt
(74) *Attorney, Agent, or Firm*—Dickstein, Shapiro, Morin & Oshinsky, LLP.

(57) ABSTRACT

A cellular system using a code division multiple access (CDMA) scheme includes N (N is a positive integer) pilot channels and M (M is a positive integer) data channels. The pilot channels are used transmitting reference signals whose transmission signals are known in advance. The data channels are used for transmitting information. Each of the M data channels is made to correspond to one or a plurality of said N pilot channels.

9 Claims, 5 Drawing Sheets

CELLULAR SYSTEM

BACKGROUND OF THE INVENTION

1. Field of the Invention

The present invention relates to a mobile telephone/portable telephone system (cellular system) using a direct spread code division multiple access (DS-CDMA) scheme and, more particularly, to a cellular system characterized by a transmission method using pilot channels for coherent detection and transmission power control.

2. Description of the Prior Art

As a conventional technique of the present invention, an IS-95 system as a standard cellular system in North America is available.

In a forward link (base station→mobile terminal) according to the IS-95 specifications, a pilot channel commonly used for channels for all mobile terminals is prepared, and signals are constantly transmitted by using about 20% of the base station transmission power. On the pilot channel, a single spread code having a relatively large length (a $2^{15}$ chip period=about 26.6 ms) is used, and a non-modulated signal (i.e., normally "0") is transmitted. The reception section of a given mobile terminal estimates the transmission path of the radio signal received by using this pilot channel (estimates the delay, phase, and amplitude). This transmission path is used to determine the de-spreading timing of a data channel addressed to the given mobile terminal and perform coherent detection and RAKE combining.

Another conventional technique is a wideband CDMA scheme (to be referred to as a W-CDMA hereinafter), which has not been put into practice. The W-CDMA is a scheme that has been studied for the third-generation cellular system (IMT-2000). Currently, in Japan, IMT-2000 standards proposals are being prepared by the Association of Radio Industries and Businesses (ARIB).

According to a conventional proposed W-CDMA scheme, a known pilot symbol (since this data is time-multiplexed with another data, it is called a pilot symbol instead of a pilot channel unlike in IS-95) is added to a channel directed to each mobile terminal.

In IS-95, a pilot channel is prepared in only a forward link. In the conventional W-CDMA, pilot channels are prepared for the respective data channels, and hence a pilot symbol is also added to a reverse link (mobile terminal→base station). The reception sections of a mobile terminal and a base station estimate a transmission path by using this pilot symbol as in IS-95, and the estimated transmission path is used to demodulate data through a data channel addressed to itself.

A pilot symbol is added to each data channel in W-CDMA in this manner to use an efficient coherent detection scheme by estimating a transmission path using the same method in both a reverse link and a forward link, thereby improving the reverse link quality. Another purpose of the addition of such pilot symbols is to reduce radio wave radiation in unnecessary directions by changing the directivity of the base station antenna for each mobile terminal in a forward link so as to improve the forward link quality.

This method is called an adaptive antenna (adaptive array antenna) or smart antenna technique. This technique is a kind of space division multiple access (SDMA) in terms of reuse of radio waves upon space division. In a CDMA cellular system, in which radio waves having the same frequency are used in all the cells, the SDMA is regarded as a promising future technique.

The first problem in the prior art is that the method of preparing a common pilot channel to all terminals as in IS-95 described above does not match well with the technique of controlling transmission directivity for each mobile terminal by using an adaptive antenna array.

That the antenna directivity of the base station changes for the respective mobile terminals means that a pilot channel through which reference signals are uniformly transmitted in all terminal directions differs in transmission paths from a data channel through which information is transmitted by an antenna whose directivity is focused on the self-terminal, and the transmission path estimation result obtained by using the pilot channel cannot be used to demodulate the information through the data channel. For example, some of multipath channels detected by using the pilot channel may fall outside the data channel directivity range. In addition, there is no guarantee that the carriers are in phase.

The second problem in the prior art is that in the method of adding a pilot symbol to each channel as in the conventional W-CDMA scheme, the overheads of the pilot symbols become excessively large, resulting in poor transmission efficiency, especially in speech communication at a low data rate.

In the conventional W-CDMA scheme, four pilot symbols are transmitted at 0.625-ms intervals, which can be regarded as an overhead corresponding to 4.26 kbps in consideration of error correction code efficiency=⅓. This overhead is not small as compared with a data rate for high-efficiency speech, e.g., 8 kbps.

The third problem in the prior art is that when a pilot symbol is added to each data channel, since large power cannot be assigned, a high-quality reference signal cannot be obtained, although about 20% of the total transmission power of the base station can be assigned to obtain a high-quality reference signal when a common pilot channel is used as in IS-95 described above. The reference signal with poor quality must be improved by, for example, filtering. This influences the complexity of each terminal.

An adaptive array antenna is a future technique and hence should not be used in consideration of cost in the early stage of introduction. It is preferable that investment in equipment be made without any adaptive array antenna in the early stage of introduction, and investment in this technique as an improved technique is made with an increase in traffic.

Transmission path estimation does not depend on data rates. For this reason, when a high data rate is set, e.g., when data services are offered at 384 kbps, the overhead of a pilot symbol can be neglected. When, therefore, low-speed voice services are mainly offered, the common pilot channel scheme is advantageous, and the individual pilot channel scheme will become an indispensable technique in the future regardless of whether high-speed data services are mainly offered. Therefore, there are demands for a flexible scheme capable of smoothly coping with changes in services in this manner.

SUMMARY OF THE INVENTION

The present invention has been made in consideration of the above situation in the prior art, and has as its main object to provide a cellular system incorporating a flexible reference signal transmission method capable of selecting an optimal apparatus arrangement in accordance with the contents of a required service.

It is another object of the present invention to provide a transmission method which can obviate the necessity to change a pilot channel/data channel assigning method even if a system is optimized from a system introduction period in which voice services are mainly offered with a relatively small traffic to a system expansion period in which high-speed data services are offered with a large traffic.

It is still another object of the present invention to simplify a mobile terminal apparatus when voice services are to be mainly offered, improve the transmission efficiency, and efficiently accommodate high-speed data services when an SDMA technology is established in the future.

In order to achieve the above objects, according to the basic aspect of the present invention, there is provided a cellular system comprising transmission sections having N pilot channels, transmission/reception sections having M data channels, a plurality of antenna elements, a weighting matrix for antenna for generating L types of antenna directivity patterns by weighting the phases and amplitudes of signals transmitted from the respective transmission sections and transmission/reception sections and supplying the resultant signals to the respective antenna elements, a control section for supplying weighting coefficients to the weighting matrix for antenna and notifying a correspondence between data and pilot channels by using a control channel, and a transmission/reception section having a control channel for notifying a pilot channel corresponding to a data channel used for communication to each mobile terminal.

The present invention is characterized in that a combination of pilot and data channels is not fixed but can be dynamically changed in accordance with the use state of the data channel.

In this manner, a plurality of pilot channels are dynamically assigned in accordance with the use state of each data channel to allow a plurality of data channels having the same antenna directivity to share a pilot channel, thus effectively using pilot channel resources.

Even if a conventional system with a fixed antenna directivity shifts to an advanced system designed to realize space division reuse of frequencies by controlling the antenna directivity of an adaptive antenna array or the like, there is no need to change a pilot channel/data channel assigning method. Such a shift can therefore be easily made.

Another effect of the present invention is that the channel capacity can be maximized in accordance with a system configuration.

This is because interference acting on other channels can be minimized by transmitting signals using the necessary minimum number of pilot channels.

The third effect of the present invention is that a very flexible system can be realized.

This is because even if a conventional system with a fixed antenna directivity shifts in the future to an advanced system designed to realize space division reuse of frequencies by controlling the antenna directivity of an adaptive antenna array or the like, there is no need to change a pilot channel/data channel assigning method, and the shift can therefore be easily made.

The above and many other objects, features and advantages of the present invention will become manifest to those skilled in the art upon making reference to the following detailed description and accompanying drawings in which preferred embodiments incorporating the principle of the present invention are shown by way of illustrative examples.

DETAILED DESCRIPTION OF THE PREFERRED EMBODIMENT

The basic aspect of the present invention will be described first with reference to the accompanying drawings.

Figure 1:
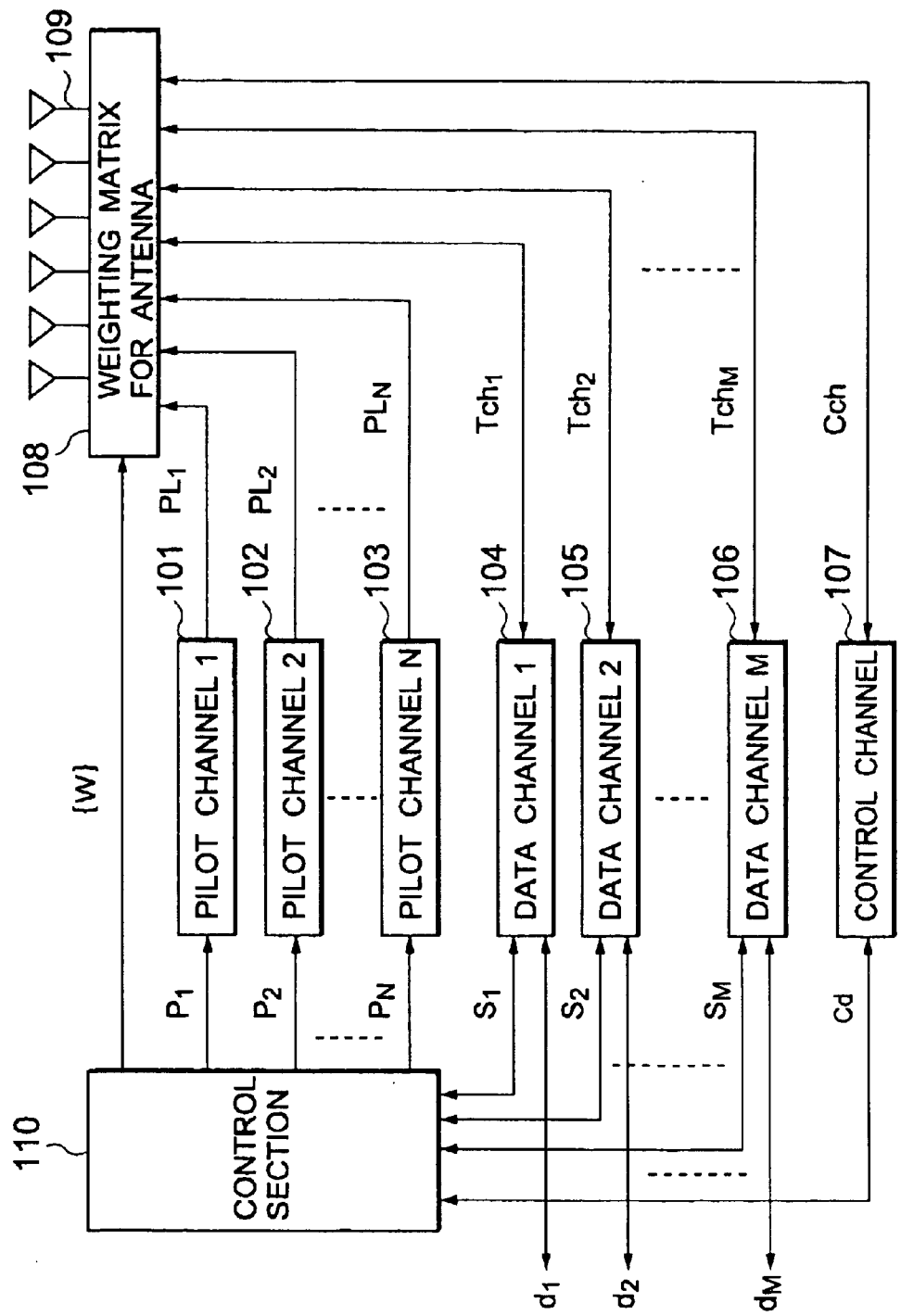
FIG. 1 is a block diagram showing a base station apparatus according to the basic aspect of the present invention.

FIG. 1 is a block diagram showing a base station apparatus according to the basic aspect of the present invention. This basic aspect is associated with a cellular system for performing communication between the base station apparatus and mobile terminals.

Referring to FIG. 1, the base station apparatus is comprised of transmission sections 101 to 103 having N (N is a positive integer) pilot channels, transmission/reception sections 104 to 106 having M (M is a positive integer) data channels, a plurality of antenna elements 109, a weighting matrix for antenna 108 for generating L (L is a positive integer) types of antenna directivities patterns by weighting the phases and amplitudes of signals transmitted from the transmission sections 101 to 103, the transmission/reception sections 104 to 106, and a transmission/reception section 107 and supplying the resultant signals to the respective antenna elements 109, a control section 110 for supplying weighting coefficients to the weighting matrix for antenna 108 and making the data channels correspond to the pilot channels, and the transmission/reception section 107 having a control channel for notifying each mobile terminal of a pilot channel corresponding to the data channel to be used for communication on the basis of a command from the control section 110. The operation of the basic aspect in FIG. 1 will be described next.

Referring to FIG. 1, reference symbols $PL_1$ to $PL_N$ denote transmission signals on pilot channels 1 to N; $Tch_1$ to $Tch_M$, transmission/reception signals on data channels (also called traffic channels) 1 to M; and $P_1$ to $P_N$, transmission control signals (for ON/OFF control for transmission, instruction about transmission power, and the like) for pilot channels 1 to N.

On data channels 1 to M, the direction of a mobile terminal that is performing communication is estimated on the basis of reception, and the control section 110 is notified of the estimated mobile terminal. The control section 110 determines the optimal antenna directivity. If the determined antenna directivity is being used on another data channel, and the corresponding pilot channel is being used for transmission, the control section 110 notifies the mobile terminal of the corresponding pilot channel number (or spread code) through the control channel. If this antenna directivity is not being used, an available pilot channel is selected to start transmission with the designated antenna directivity.

If the position of the mobile terminal is unknown before speech communication, communication may be started with an omni-directivity first, and the antenna directivity and corresponding pilot channel may be changed when the direction of the mobile terminal is estimated.

If excess overhead results when pilot channels are separately set, as in voice terminals, wastes resulting from the overhead can be reduced by assigning a common pilot channel to a plurality of terminals.

When communication through a given data channel is complete, and another data channel does not share the corresponding pilot channel, transmission is stopped by using the corresponding pilot channel. If another data channel shares the pilot channel, transmission is continued by using the pilot channel.

Figure 2:
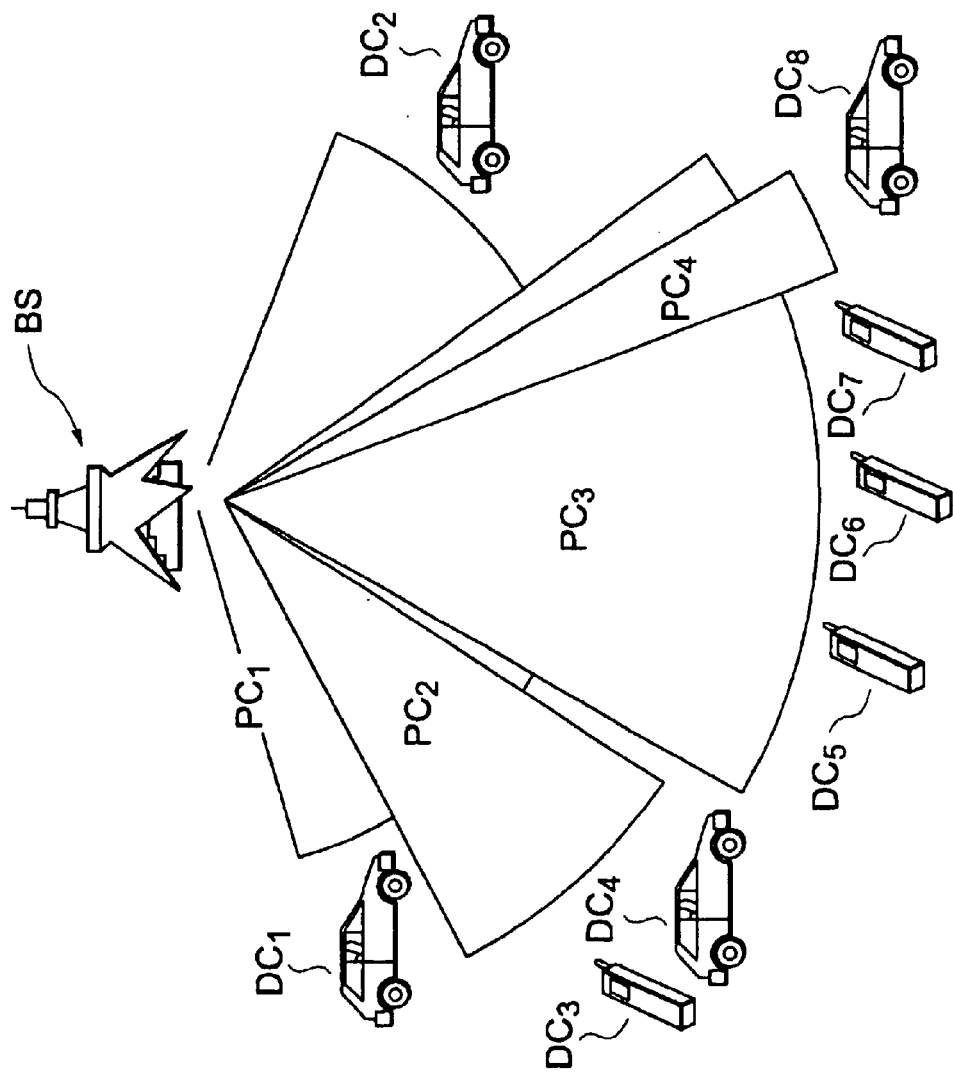
FIG. 2 is a view for explaining the correspondence between antenna directivities, pilot channels, and data channels in the basic aspect.

FIG. 2 is a view for explaining the correspondence between antenna directivities and pilot and data channels in the basic aspect.

FIG. 2 shows an example of how pilot and data channels are assigned in accordance with antenna directivity patterns and the positions of mobile terminals. At this time, the antenna elements 109 are using four types of directivity patterns and pilot channels $PC_1$ to $PC_4$. Any directivity pattern in a direction in which no terminal is performing speech communication is not used.

The pilot channel $PC_1$ covers all directions. This channel is used by a mobile terminal whose position is not detected immediately after the start of speech communication, an in-car terminal that is moving near a base station BS at a high speed (i.e., a terminal whose direction changes at short intervals when viewed from the base station), or the like. The pilot channels $PC_2$ and $PC_3$ are shared among a plurality of data channels located in the same directions. The pilot channel $PC_3$ is shared among a plurality of voice terminals, and has a relatively wide directivity pattern. A data channel $DC_8$ is a high-bit-rate channel, to which one pilot channel $PC_4$ is exclusively assigned. This channel reduces interference with other channels by using a narrow antenna directivity pattern.

Figure 3:
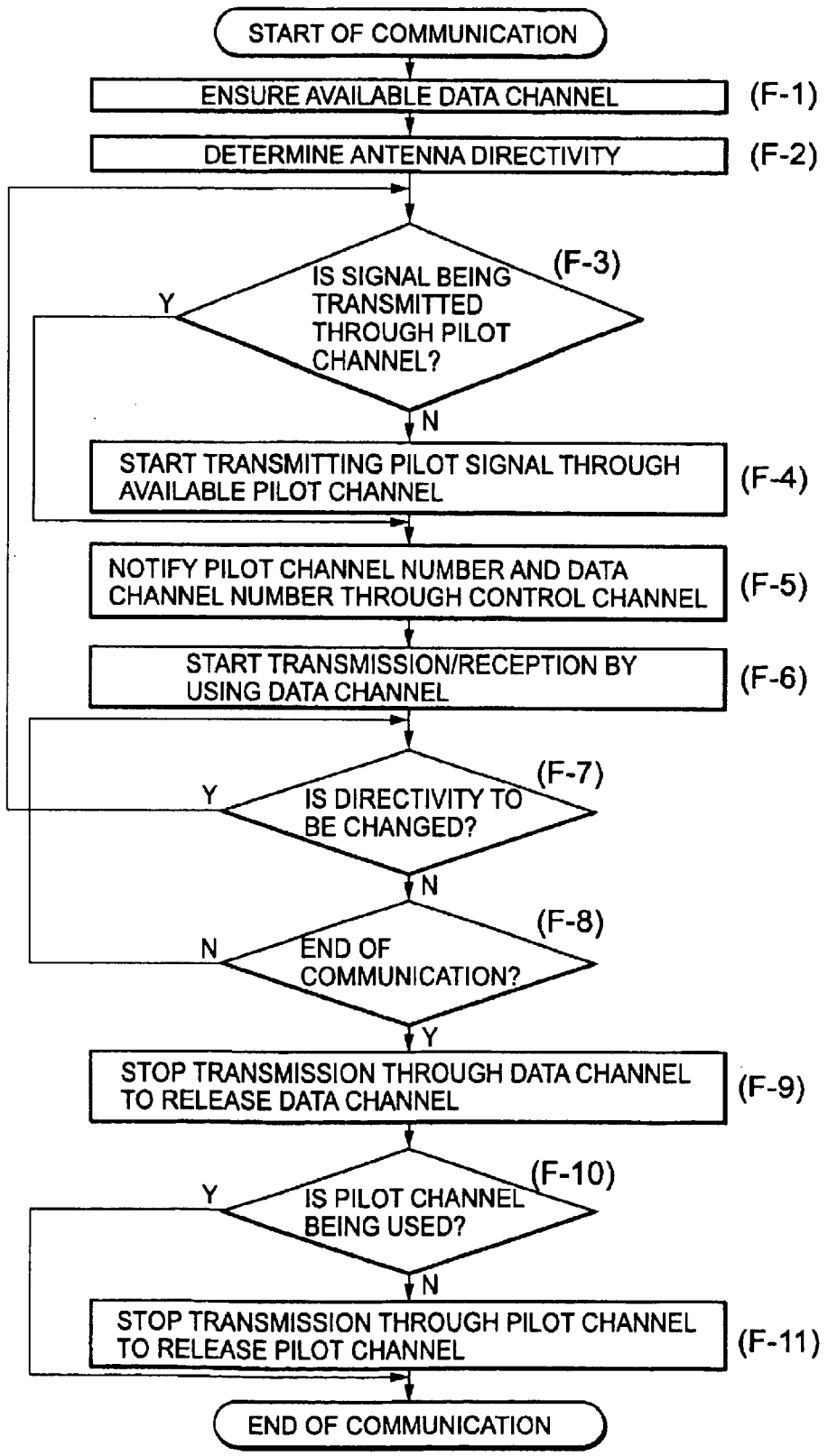
FIG. 3 is a flow chart showing the operation of the basic aspect.

FIG. 3 is a flow chart showing the operation of the basic aspect.

Referring to FIG. 3, when communication is to be started, an available data channel is found first to ensure a data channel transmission/reception means (step F-1). If the direction of the mobile terminal is known at this time, the optimal antenna directivity for the direction of the mobile terminal is selected. If the direction of the mobile terminal is unknown, an antenna directivity in all directions in which the mobile terminal can exist may be selected (step F-2).

If another terminal exists in the direction of this antenna directivity and is performing communication (step F-3), since this terminal is performing transmission with the antenna directivity by using a pilot channel, this pilot channel may be used. That is, any new pilot channel transmission means need not be ensured. If this antenna directivity is unused (step F-3), an available pilot channel transmission means is ensured, and transmission is started by using the pilot channel (step F-4).

Subsequently, pilot and data channel numbers (or spread codes) indicating the channels to be used by the mobile terminal are notified by using the control channel to start transmission/reception by using the data channel (step F-6).

Assume that the optimal antenna directivity changes as in case wherein the position of the mobile terminal has moved to the end of the antenna directivity during communication, or the direction of the mobile terminal, which was unknown at the start of communication, is known after a period during which transmission/reception is performed with a wide directivity (step F-7). In this case, processing in step F-3 and the subsequent steps are performed for the new antenna directivity. Whether a change in antenna directivity is required is periodically monitored during communication.

When the communication is complete (step F-8), the transmission/reception using the data channel is stopped to release the data channel transmission/reception means (step F-9). If the same pilot channel is not being used by another data channel (step F-10), the transmission using the pilot channel is also stopped to release the pilot channel (step F-11). If the same pilot channel is being used by another data channel (step F-10), the processing associated with the data channel is terminated without stopping the transmission using the pilot channel.

An embodiment of the present invention will be described next with reference to FIGS. 4 to 6.

Figure 4:
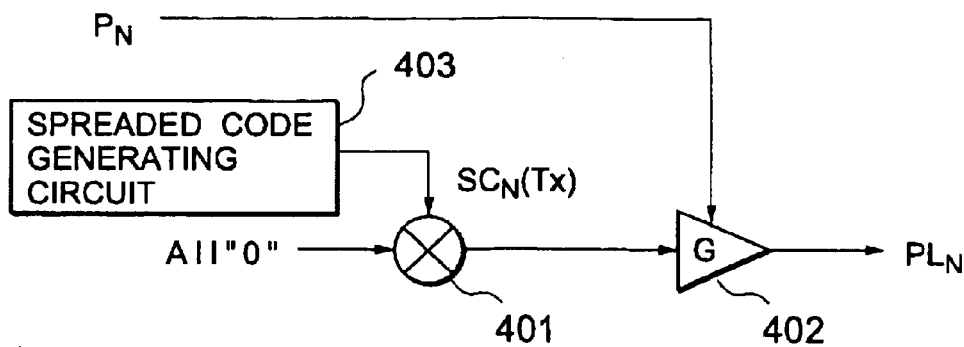
FIG. 4 is a block diagram showing an example of the arrangement of a pilot channel transmission section.

FIG. 4 is a block diagram showing an example of the arrangement of a transmission section corresponding to data channel N.

Figure 5:
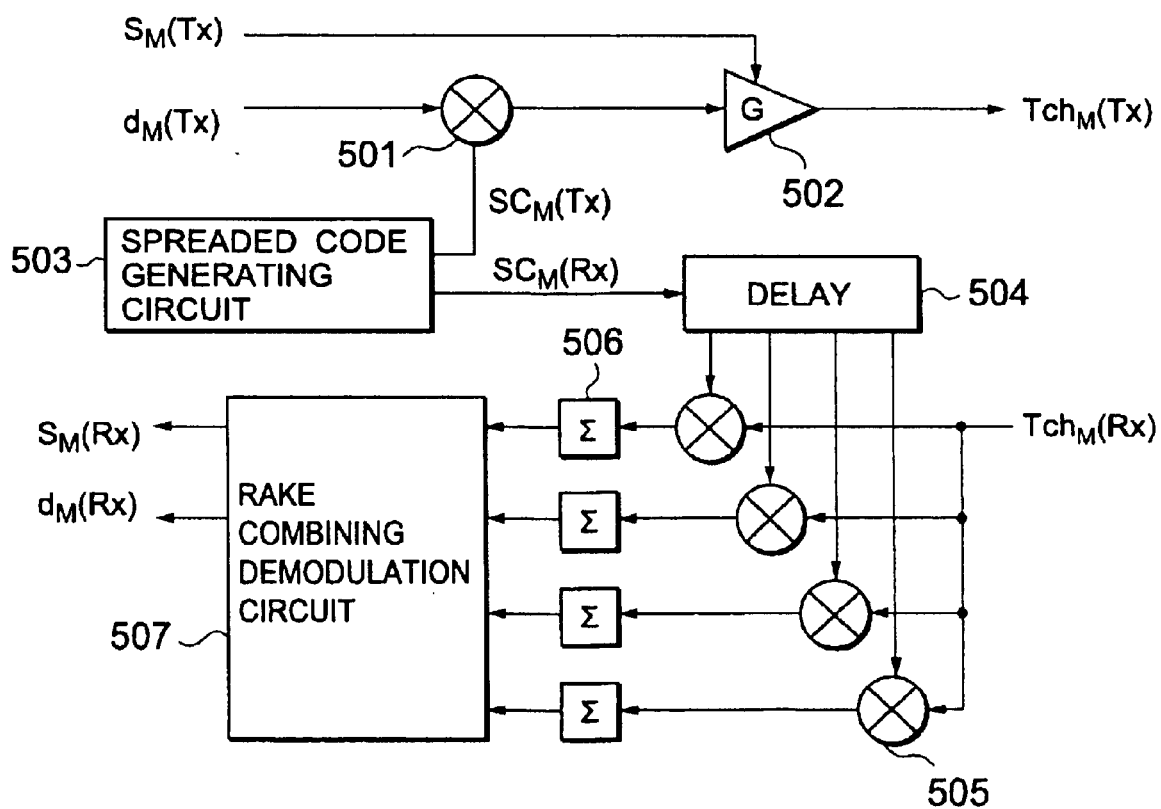
FIG. 5 is a block diagram showing an example of the arrangement of a data channel transmission/reception section.

FIG. 5 is a block diagram showing an example of the arrangement of a transmission/reception section corresponding to data channel M.

Figure 6:
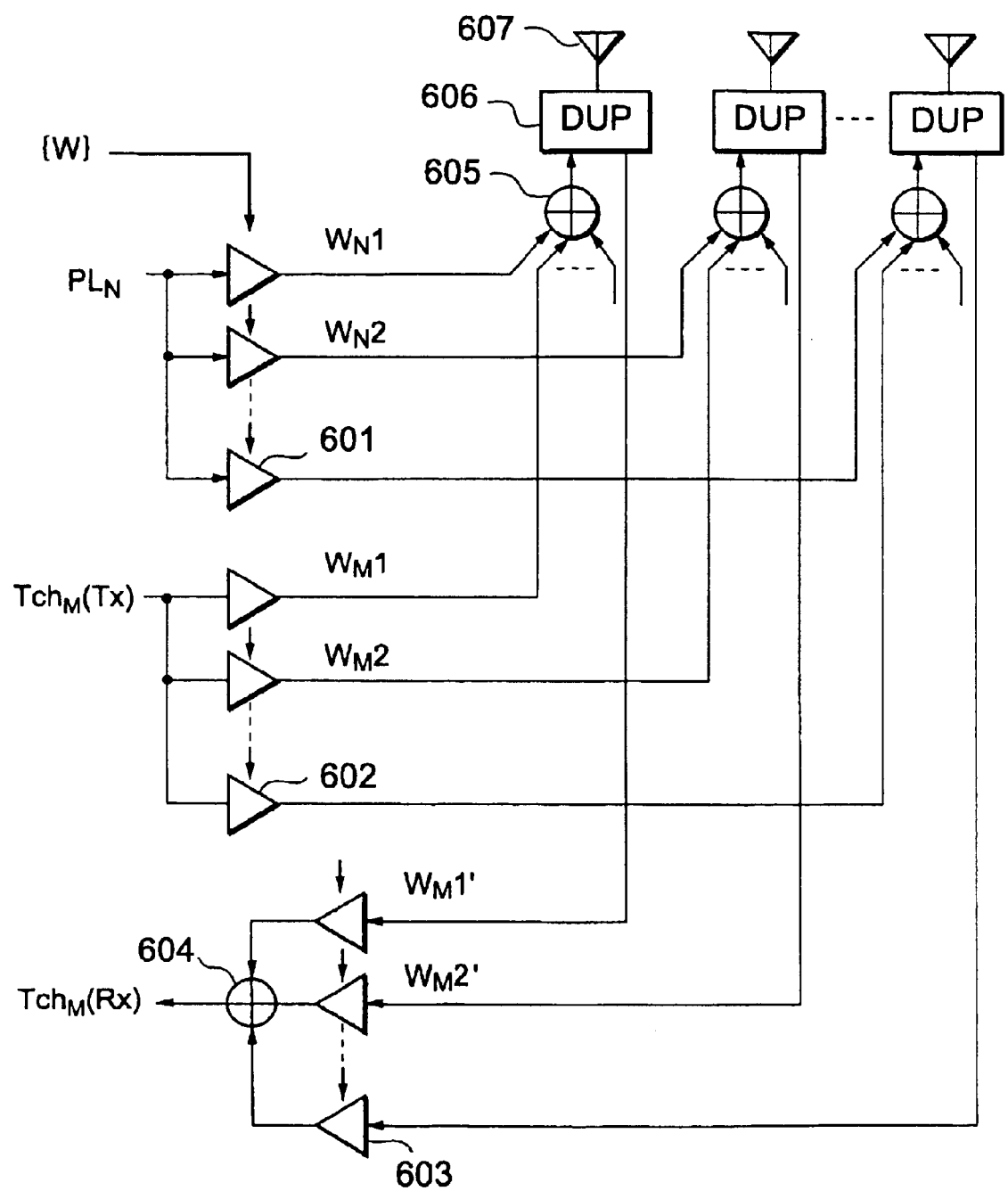
FIG. 6 is a block diagram showing an example of the arrangement of a weighting matrix for antenna and antenna elements.

FIG. 6 is a block diagram showing an example of the arrangement of a weighting matrix for antenna and antenna elements.

Referring to FIG. 4, a transmission section for a pilot channel in this embodiment includes a spreading circuit 401 for spreading data consisting of "0"s alone by multiplying the data by a spread code $SC_N(Tx)$, a spread code generating circuit 403 for generating the spread code $SC_N(Tx)$, and a transmission power control circuit 402 for controlling the transmission power for the spread signal. Different spread codes are assigned to the respective channels and hence used as means for discriminating the channels in code division multiple access (CDMA) sharing the same frequency among all the channels.

Referring to FIG. 5, a data channel transmission/reception means in this embodiment includes a spreading circuit 501 for spreading transmission data $d_M(Tx)$ with a transmission spread code $SC_M(Tx)$, a transmission power control circuit 502 for controlling the transmission power for the spread signal, a spread code generating circuit 503 for generating the transmission spread code $SC_M(Tx)$ and a reception spread code $SC_M(RX)$, a delay circuit 504 for delaying the reception spread code $SC_M(RX)$ in accordance with a delay in each path of multipath channels for reception signals, de-spreading circuits 505 that are equal in number to the paths and multiply the delayed reception spread signals and the reception signals through the data channels, integration circuits 506 that are equal in number to the paths and cumulatively add the de-spread signals for a 1-symbol time, and a RAKE combining demodulation circuit 507 for combining the outputs from the integration circuits 506 corresponding to the respective paths in phase at a maximum ratio.

Referring to FIG. 6, a weighting matrix for antenna on the transmission side in this embodiment includes weighting circuits 601 and 602 for weighting signals (including amplitudes and phases) to be output to the respective antenna elements over transmission signals on the respective channels with weighting coefficients {W} supplied from the control section, addition circuits 605 that are equal in number to the antenna elements, each circuit adding/combining transmission signals in each channel, duplexers 606 which are equal in number to the antenna element, each allowing one antenna element to be used for transmission and reception, and a plurality of antenna elements 607. Similarly, on the reception side, the matrix includes a weighting circuit 603 for weighting the signal (including the amplitude and phase) received by each antenna element with a weighting coefficient {W} supplied from the control section, and an addition circuit 604 for adding/combining the respective weighted reception signals.

The operation of the cellular system according to the present invention will be described next with reference to FIG. 6.

As in the basic aspect of the present invention described above, when data communication is to be started, the directivity of each reception antenna is determined to maximize the signal-to-interference ratio (SIR) of a received signal. More specifically, it suffices if weighting coefficients ($W_M1'$, $W_M2'$, . . . ) are determined to maximize the short-time average of SIRs. In addition, the transmission directivity of each data channel is determined to have the same antenna directivity as that used for reception. In an ideal radio system (the gain and phase characteristics remain unchanged in transmission and reception), it suffices if coefficients complex conjugate to the weighting coefficients {$W_M1'$, $W_M2'$, . . . } used for reception are used as transmission weighting coefficients {$W_M1$, $W_M2$, . . . }.

The above operation may be simplified by limiting the weighting coefficients {$W_M1'$, $W_M2'$, . . . } and {1, $W_M2$, . . . } to "1"s and "0" is alone. That is, one (or a plurality) of antennas to which directivities are assigned in advance is selected and used for transmission/reception. In this case, the directivity in transmission can be easily matched with that in reception. This can greatly reduce the processing amount for antenna directivity determination and simplify adjustments to the gain and phase of the radio system. However, the degree of freedom in antenna directivity is limited.

Data channels can be made to correspond to pilot channels by notifying the spread codes used in the respective channels. The transmission power for a pilot channel or data channel is controlled to 0 (OFF) to prevent unnecessary interference from disturbing other channels in use.

What is claimed is:

1. A cellular system using a code division multiple access (CDMA) scheme, comprising:

N (N is a positive integer greater than 1) pilot channels for transmitting reference signals whose transmission signals are known in advance; and M (M is a positive integer greater than 1) data channels for transmitting information;

wherein each of said M data channels is made to dynamically correspond to one or a plurality of said N pilot channels, wherein a correspondence between said pilot channel and said data channel is newly determined at least immediately before and every time said data channel is used.

2. A cellular system using a code division multiple access (CDMA) scheme, comprising:

N (N is a positive integer greater than 1) pilot channels for transmitting reference signals whose transmission signals are known in advance; and M (M is a positive integer greater than 1) data channels for transmitting information;

wherein each of said M data channels is made to dynamically correspond to one or a plurality of said N pilot channels, wherein a correspondence between said pilot channel and said data channel can be changed during use of said data channel by notifying a new correspondence.

3. A cellular system using a code division multiple access (CDMA) scheme, comprising:

N (N is a positive integer greater than 1) pilot channels for transmitting reference signals whose transmission signals are known in advance; and M (M is a positive integer greater than 1) data channels for transmitting information;

wherein each of said M data channels is made to dynamically correspond to one or a plurality of said N pilot channels, wherein said pilot channel stops transmission when use of all data channels made to correspond to said pilot channel is terminated.

4. A cellular system using a code division multiple access (CDMA) scheme, comprising:

N (N is a positive integer greater than 1) pilot channels for transmitting reference signals whose transmission signals are known in advance; and M (M is a positive integer greater than 1) data channels for transmitting information;

wherein each of said M data channels is made to dynamically correspond to one or a plurality of said N pilot channels, and each of said N data channels is made to correspond to one of said M pilot channels which goes through the same transmission path, wherein when a pilot channel which goes through the same transmission path as that for a data channel to be newly used is not being used for transmission, a new pilot channel which goes through the same transmission path as that for said data channel is generated and used to start transmission.

5. A cellular system using a code division multiple access (CDMA) scheme, comprising:

N (N is a positive integer greater than 1) pilot channels for transmitting reference signals whose transmission signals are known in advance; and M (M is a positive integer greater than 1) data channels for transmitting information;

wherein each of said M data channels is made to dynamically correspond to one or a plurality of said N pilot channels, wherein when channels used for transmission/reception with the same antenna directivity are determined as channels which go through the same transmission path.

6. A cellular system using a code division multiple access (CDMA) schemes comprising:

N (N is a positive integer greater than 1) pilot channels for transmitting reference signals whose transmission signals are known in advance; and M (M is a positive integer greater than 1) data channels for transmitting information;

wherein each of said M data channels is made to dynamically correspond to one or a plurality of said N pilot channels, and each of said N data channels is made to correspond to one of said M pilot channels which goes through the same transmission path, wherein when channels used for transmission/reception with the same antenna directivity are determined as channels which go through the same transmission path.

7. A cellular system using a code division multiple access (CDMA) scheme, comprising:

transmission means having N (N is a positive integer) pilot channels;

transmission/reception means having M (M is a positive integer) data channels;

antenna means having L (L is a positive integer) types of directivity patterns; and notification means for dynamically notifying a correspondence between said data channels and said pilot channels, wherein information to be transmitted/received by using each of said M data channels is transmitted/received by selecting an optimal pattern from the L types of directivity patterns in accordance with a position of a mobile terminal used for communication, a reference signal to be transmitted by using each of said N pilot channels is transmitted by selecting one pilot channel for each directivity pattern used for said data channel, and said notification means notifies a pilot channel used for transmission with the same directivity pattern as that for said data channel.

8. A reference signal transmission method in a cellular system using a code division multiple access (CDMA) scheme of transmitting reference signals by using N (N is a positive integer) pilot channels, transmitting/receiving information by using M (M is a positive integer) data channels, performing transmission/reception by using said data channels through antenna means having L (L is a positive integer) types of directivity patterns, and dynamically notifying a correspondence between said data channels and said pilot channels through notification means, comprising the steps of:

transmitting/receiving information to be transmitted/received by using each of said M data channels by selecting an optimal pattern from the L types of directivity patterns in accordance with a position of a mobile terminal used for communication;

transmitting a reference signal to be transmitted by using each of said N pilot channels by selecting one of said pilot channels for each directivity pattern which is being used on said data channel; and causing said notification means to notify a pilot channel which is being used for transmission with the same directivity pattern as that for said data channel.

9. A base station apparatus in a cellular system using a code division multiple access (CDMA) scheme, comprising:

transmission means having N (N is a positive integer) pilot channels;

transmission/reception means having M (M is a positive integer) data channels;

antenna means having L (L is a positive integer) types of directivity patterns; and notification means for dynamically notifying a correspondence between said data channels and said pilot channels, wherein information to be transmitted/received by using each of said M data channels is transmitted/received by selecting an optimal pattern from the L types of directivity patterns in accordance with a position of a mobile terminal used for communication, a reference signal to be transmitted by using each of said N pilot channels is transmitted by selecting one pilot channel for each directivity pattern used for said data channel, and said notification means notifies a pilot channel used for transmission with the same directivity pattern as that for said data channel.

* * * * *